Figure 1:
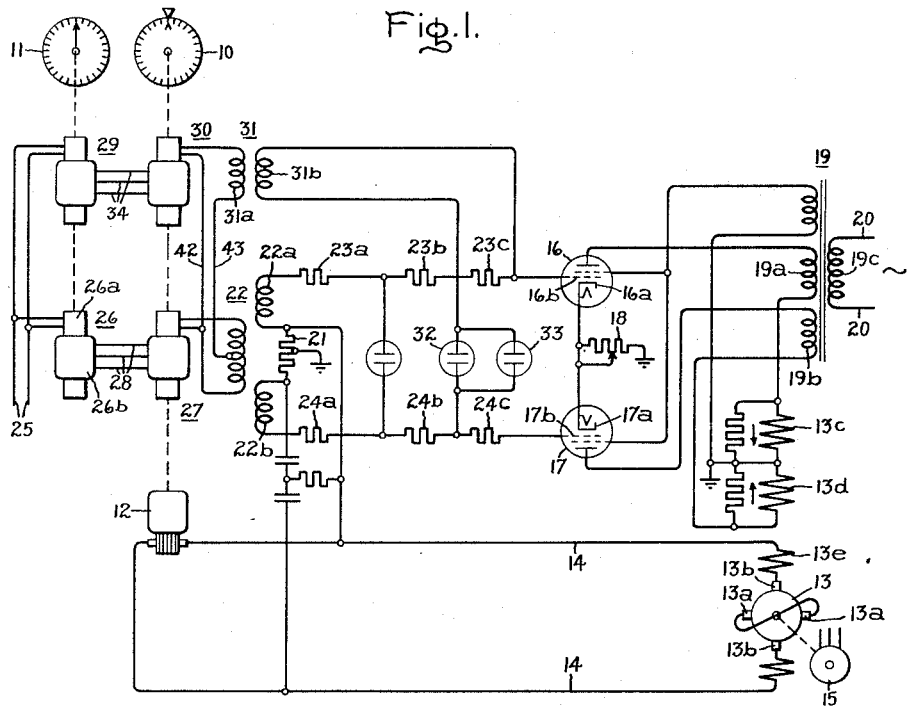

Dec. 9, 1947.   B. J. FISHER, JR   2,432,302
FOLLOW-UP CONTROL SYSTEM
Filed Oct. 23, 1943

Inventor:
Benjamin J. Fisher, Jr.,
by Harry E. Dunham
His Attorney.

Patented Dec. 9, 1947

2,432,302

UNITED STATES PATENT OFFICE 2,432,302

FOLLOW-UP CONTROL SYSTEM

Benjamin J. Fisher, Jr., Schenectady, N. Y., assignor to General Electric Company, a corporation of New York Application October 28, 1943, Serial No. 508,991

3 Claims. (Cl. 318—30)

1

This invention relates to control systems, more particularly to follow-up control systems and it has for an object the provision of a simple, reliable and improved control system of this character.

More specifically, this invention relates to follow-up control systems in which electric valve apparatus is employed to control the supply of current to the driving motor and in which fine and coarse controlling means are employed for controlling the valve apparatus together with means for shifting the control of the valve apparatus from the fine controlling means to the coarse controlling means when the positional disagreement of the pilot device and driven object, or system error, exceeds a predetermined amount. In systems of this character, the fine and coarse controlling means each produce alternating control voltages. In order that the driving means shall be energized in the proper direction to restore the driven object and pilot device to correspondence by the shortest path, the apparatus is designed so that these control voltages decrease to zero as the system error becomes zero and reverse in phase if the error passes through zero and changes sign. Since the coarse control voltage passes through zero at zero error, it must also pass through zero at 180° error. The means which shift the control of the valve apparatus from the fine to the coarse controlling means and vice versa is responsive to a predetermined value of the control voltage produced by the coarse controlling means. Consequently, the fine controlling means will regain control of the valve apparatus within a predetermined zone on each side of the 180° error point, as well as within the same zone on each side of the zero error, or correspondence point. However, if the fine controlling means has an even ratio, i. e. rotates an even number of times for each rotation of the coarse controlling means, the control voltage produced by the fine controlling means will be reversed in phase with respect to the voltage produced by the coarse controlling means within the zone on either side of the 180° error point in which the fine controlling means has control of the valve apparatus. Consequently, within this zone, the valve apparatus will energize the motor for the wrong direction of rotation and the 180° error point will thus become a position of stable equilibrium of the system. As a result, if the driven object and pilot device are moved out of correspondence by an amount such that the error falls within this zone when power is removed from the system, the

2 driven object will be driven to the 180° error point and synchronized in that position when power is restored to the system. This of course is an undesirable operating condition and it becomes important to design the system so that this zone of stable equilibrium at the 180° error point is made as narrow as possible. It is frequently very difficult to meet the user's requirement as to the width of this zone solely by design of the electrical constants of the system and attempts to narrow this zone in this manner have led to instability in the operation of the system which is also a highly undesirable operating characteristic.

In carrying the invention into effect in one form thereof, a voltage is derived from the voltage produced by the fine controlling means. Within the zone on either side of the 180° error point in which the fine controlling means has control, this derived voltage is of reverse phase with respect to the phase of the voltage produced by the coarse controlling means. Electrical connections are provided for reversing the phase of this derived voltage and combining it with the control voltage produced by the coarse controlling means in an additive sense within the "fine" control zone on either side of the 180° error point. Thus, the voltage produced by the coarse control means is maintained above the critical value at which control is transferred to the fine control means, and thus retains control until the error has increased a predetermined amount and the fine control zone has been narrowed a corresponding amount.

Figure 2:
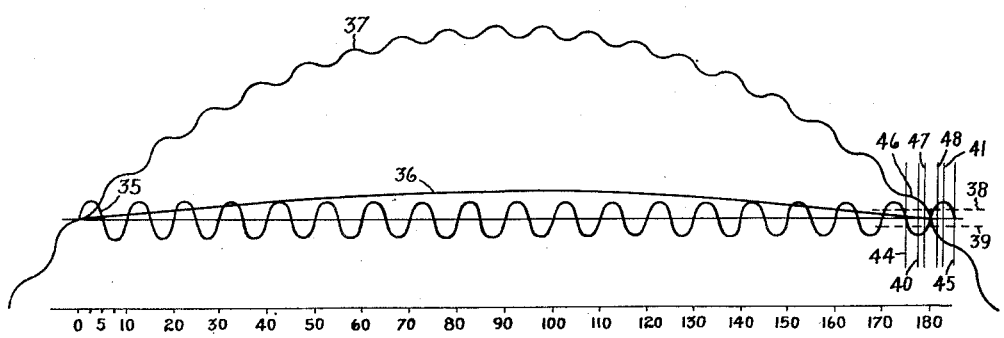

For a better and more complete understanding of the invention, reference should now be had to the following specification and to the accompanying drawing of which Fig. 1 is a simple diagrammatical sketch of an embodiment of the invention, and Fig. 2 is a chart of operating characteristics which facilitate an understanding of the invention.

Referring now to the drawing, an object 10 is to be driven in positional agreement with a pilot or control device 11 by suitable driving means such, for example, as represented by the direct current motor 12 to the drive shaft of which the object 10 is connected by means of suitable reduction gearing (not shown). Direct current is supplied to the armature of the motor 12 by means of a special generator 13 having a pair of short-circuited armature brushes 13a and a pair of load brushes 13b to which the armature of the motor 12 is connected by means of conductors 14.

The generator 13 is an armature reaction excited dynamoelectric machine and is driven at a speed which is preferably substantially constant, by any suitable driving means such as an induction motor 15 to the drive shaft of which the shaft of the armature reaction machine is connected by suitable coupling means (not shown). The axis of the flux which is produced by the short-circuited armature brushes is referred to as the short-circuit axis, and the axis which is displaced 90 electrical degrees from the short-circuit axis is referred to as the control axis. The net flux along the control axis is produced by the two opposing control field windings 13c and 13d, a series compensating field winding 13e and the armature reaction of the load current itself. This net control axis flux produces the voltage at the brushes 13a which causes current to flow in the short-circuit and the flux along the short-circuit axis, which is produced by the short-circuit current, produces the voltage at the load brushes 13b which causes load current to flow. The important characteristics of dynamoelectric machine 13 are its high speed of response and its exceptionally high amplification factor, i. e. the ratio between the electrical power supplied to the control field winding and the electrical power delivered at the load brushes of the machine.

The control field windings 13c and 13d on the control axis of the armature reaction excited dynamoelectric machine 13 are connected in the cathode-anode circuits of a single stage electric valve amplifier which comprises the two electric valves 16 and 17. Although these valves may be of any suitable type, they are preferably beam power amplifier valves. As shown, they are connected for duplex operation and are provided with a self-biasing resistor 18. The cathode-anode circuits of these valves are connected in series with the secondary windings 19a and 19b of a supply transformer 19 whose primary winding 19c is connected to a suitable source of alternating voltage, such as represented by the two supply lines 20.

The cathode grid, or input circuit, of the amplifier extends from the cathodes 16a and 17a of the valves 16 and 17 through the self-biasing resistor 18 and the ground connection to the center tap of a resistor 21, through opposite halves of the resistor and the secondary windings 22a and 22b of the grid control transformer 22 in parallel and resistors 23a, 23b and 23c, and resistors 24a, 24b and 24c in parallel to the control grids 16b and 17b respectively.

With zero voltage supplied to the grids 16b and 17b from the transformer secondaries 22a and 22b, the valves 16 and 17 will supply circulating currents through the two opposing control field windings 13c and 13d. The magnitude of these circulating currents is controlled as desired by adjustment of the self-biasing resistor 18. This resistor is usually adjusted for half the saturation current of the valve. The circuit is accurately balanced so that both valves normally conduct equal amounts of current. Since the control field windings 13c and 13d oppose each other and are equally excited when no voltage is supplied to the grids 16b and 17b from the transformer 22, the net excitation of dynamoelectric machine 13 is zero. As a result, zero voltage is supplied to the motor 12 and the motor is therefore at standstill. This condition of equal conduction in both valves occurs when the follow-up system is in correspondence, i. e. when the driven object is in positional agreement with the pilot device.

In order to vary the bias voltage of the grids 16b and 17b of valves 16 and 17, a component voltage of variable magnitude is supplied to the grid circuits substantially in phase with the anode voltage through the transformer 22 whose secondary windings 22a and 22b are connected in the cathode grid circuits of the valves 16 and 17 as explained in the foregoing and whose primary winding is connected to the single phase alternating current source 25 through rotary induction apparatus illustrated as comprising a rotary induction device 26 referred to as the transmitter and a similar rotary induction device 27 referred to as the receiver regulator. The rotary induction device 26 comprises a rotor member 26a provided with a single phase winding (not shown) and a stator member 26b provided with a distributed three-element winding (not shown) that is physically similar to the polyphase winding of an ordinary wound rotor induction motor. The stator and rotor windings are arranged in inductive relationship with each other so that the alternating magnetic field, produced by the current flowing in the primary winding, induces voltages in the elements of the secondary winding. The receiver regulator 27 is in all respects identical with the transmitter 26 and the terminals of its stator winding are connected to the terminals of the stator winding of the transmitter by means of conductors 28 so that the voltages induced in the stator winding of the transmitter cause currents to flow in the stator winding of the receiver regulator, thereby producing a magnetic field similar to the magnetic field produced by the currents flowing in the rotor winding of the transmitter. Rotation of the rotor member of the transmitter causes a voltage to be induced in the rotor winding of the receiver regulator owing to the shift in the position of the axis of the magnetic field of the receiver regulator relative to the axis of the winding of the rotor member, and the magnitude of this induced voltage depends upon the relationship of the axis of this winding to the axis of the magnetic field. When the axes of the magnetic field and the rotor winding are parallel, the induced voltage is maximum whereas when these axes are at right angles with each other the induced voltage is zero. It will therefore be clear that rotation of the rotor of the transmitter or of the receiver regulator will vary the magnitude of the component voltage supplied to the grid circuit of the electric valve apparatus which, in turn, will result in a variation of the relationship of the currents flowing in the conducting paths of the valves 16 and 17.

The grid connections from the secondary windings 22a and 22b to the grids 16b and 17b are such that the voltages supplied to the grids are 180° out of phase with each other. Thus when the voltage supplied to one of the grids increases positively, the voltage of the other grid is simultaneously made correspondingly less positive or more negative.

The rotor of the transmitter 26 is mechanically coupled through suitable gearing (not shown) to the movable element of the pilot device 11. For the purpose of increasing the accuracy and sensitivity of the control, the ratio of this gearing between the pilot device and the rotor of the transmitter can be made as large as is desired, for example, the ratio may be 36:1, i. e., for each degree that the pilot device is rotated the rotor of the transmitter is rotated 36°. The rotor of the receiver regulator 27 is connected either to the shaft of the motor 12 or to the shaft of the driven object 10 by means of suitable gearing (not shown) having the same ratio as the gearing between the pilot device and the transmitter.

This large gear ratio provides a very fine and very accurate control. If the ratio is 36:1 as assumed, then for each 10° of rotation of the pilot device the rotor of the transmitter 26 is rotated a full 360°. However, since the axes of rotor winding of the receiver regulator 27 and the magnetic field of the stator are parallel at two points in each complete revolution of the transmitter, i. e. at zero degrees revolution and at 180° revolution of the transmitter, it will be clear that the pilot device and the driven object must not be allowed to become more than 5° out of correspondence with each other while under the control of the high speed fine control system, because when this amount of positional disagreement occurs, the same relationship exists between the rotors of the transmitter and receiver regulator as exists when the pilot device and driven object are in correspondence with each other. In practice, under actual operating conditions the rotor of the transmitter often does become more than this amount out of correspondence with the driven object 10 and a coarser system is therefore provided for taking over the control from the high speed fine control system before this amount of positional disagreement is exceeded. This coarse system is illustrated as comprising a transmitter 29 that is identical with the transmitter 26 and a receiver regulator 30 that is identical with the receiver regulator 27. The single phase rotor winding of the transmitter 29 is connected to the alternating voltage source 25 and the single phase rotor winding of the receiver regulator is connected to the terminals of the primary winding 31a of a transformer 31 the terminals of the secondary winding 31b of which are connected to the grids 16b and 17b through the electric valves 32 and 33. The stator windings of the transmitter 29 and the receiver regulators 30 are connected to each other by means of conductors 34.

The rotor of the transmitter 29 is directly connected to the rotatable member of the pilot device 11 by means of suitable gearing having a 1:1 ratio and the rotor member of the receiver regulator 30 is connected through suitable gearing (not shown) having a 1:1 ratio to the driven object 10. Thus it will be seen that the transmitter 29 and the receiver regulator 30 constitute a low speed system and provide the desired coarse control.

The electric valves 32 and 33 may be of any suitable type but are preferably of the two-electrode type into the envelopes of which a small quantity of an inert gas such, for example, as neon is introduced. A characteristic of a valve of this character is that when a voltage of less than a predetermined value is applied to its terminals, the valve does not conduct current and that when this voltage is exceeded, the neon gas becomes ionized and the valve becomes conducting.

The transformer 31 is so designed that when the system error of the pilot device and driven object is less than a predetermined amount, e. g. 2½° or less, the voltage applied to valves 32 and 33 is less than the ionization or breakdown voltage of these valves but equals or exceeds the ionization voltage when the system error equals or exceeds this predetermined amount. Thus, when the system error is less than this predetermined amount, the control connections between the coarse control system and the grids 16b and 17b are interrupted and the coarse control system is ineffective and when the error equals or exceeds this amount, the valves 32 and 33 become conducting and the voltage induced in the secondary winding of the transformer 31 is applied to the grids 16b and 17b and is thereafter effective in controlling the valves 16 and 17. The high ohmic resistance of resistors 23a, 23b, 24a and 24b assist the valves 32 and 33 in transferring the control from the fine control system to the coarse control system when the error equals or exceeds the predetermined amount mentioned in the foregoing description.

The error voltage supplied from the receiver regulator of the high speed fine control system to the grid transformer 22 is an alternating voltage having the same frequency as that of the source 25. A plot of the effective values only of this error voltage is illustrated by the sinusoidal curve 35 in Fig. 2 in which ordinates represent voltage and abscissae represent system error, i. e. positional disagreement between the driven object 10 and the pilot device 11. Thus, at zero error or correspondence, the axes of the rotor winding of the receiver regulator and of the magnetic field of the primary winding are at right angles and the magnitude of the error voltage is zero. If the error is increased to 2½° clockwise, i. e. the pilot device 11 becomes advanced 2½° clockwise with respect to the driven object, the displacement of the axes of the magnetic field and of the rotor winding is increased 90° so that they are now parallel and the error voltage attains a maximum value. This error voltage is in phase with the voltage of the source 25. This in-phase relationship is indicated by the position of this portion of the curve 35 above the zero axis.

A further increase of the error to 5° clockwise increases the displacement of the axes of the rotor winding and the magnetic field of the stator winding another 90° so that these axes are again at right angles with each other but displaced 180° from their original positional relationship. Consequently, the error voltage is reduced to zero.

If the error is increased beyond 5° clockwise, the phase of the error voltage will be reversed and this condition is indicated by the position of the portion of the curve between 5° error and 10° error below the zero axis. Thus, the amplitude of curve 35 represents the magnitude of the error voltage and positive values of this curve indicate that the voltage is in phase with the voltage of the source and negative values indicate a 180° out-of-phase relationship. As indicated, the phase of this voltage reverses for each 5° increase of error.

The error voltage supplied by the receiver regulator 30 of the low speed coarse control system is also an alternating voltage having the same frequency as that of the source 25. A plot of the effective values of this error voltage produced by the coarse control system is represented by the curve 36 of Fig. 2. Since the gearing ratio of the low speed coarse control system is 1:1, the error voltage is zero at zero error, maximum at 90° error and zero at 180° error. It is in phase with the voltage of the source 25 from zero degrees error to 180° error clockwise and it is 180° out of phase from 180° error clockwise to zero error. In other words, the phase reverses at the zero degree and 180° error points.

The ratio of primary to secondary currents of transformer 22 may be assumed to be 1:1 so that the curve 35 represents the secondary voltage of transformer 22 as well as the primary or error voltage. The transformer 31, however, is a step-up transformer and the secondary voltage is therefore represented by the sinusoidal curve 37 of substantially greater amplitude than the curve 36 which represents the primary voltage.

It will be noted that within the zone of 5° either side of the 180° error point, the voltages produced by the fine and coarse receiver regulators 27 and 30 are 180° out of phase with each other. This is indicated in Fig. 2 by the positioning of curves 35 and 37 on opposite sides of the zero axis within the 5° error zone on either side of 180° error. Consequently, as long as the voltage from the transformer 31 of the low speed coarse control system as represented by curve 37 is greater than the value, represented by horizontal lines 38 and 39, at which control is transferred between the fine and coarse control systems, the driving motor 12 is energized for rotation in a direction to drive the driven object toward the position of zero error or correspondence with the pilot device. However, when this voltage decreases below the critical value, represented by the horizontal lines 38 and 39, the voltage from the transformer of the fine control system, which is of reverse phase with respect to the voltage from the transformer 31 of the coarse control system, will energize the motor 12 to drive the object 10 in the reverse direction. In other words, the motor will be energized to drive the object 10 toward the 180° error point. If, while the power is removed from the system, the pilot device 11 is moved out of correspondence an amount such that the error of the system falls within a zone of approximately 2½° on either side of the 180° error point as represented by the vertical lines 40 and 41, the driven object 10 will be synchronized 180° out of correspondence with the pilot device when the power is restored to the system. In other words, if the system error falls within the zone defined by the vertical lines 40 and 41, the 180° error point becomes a point of stable equilibrium. This operating condition is highly objectionable and it is therefore desirable to narrow to a minimum this zone within which the false operation described in the foregoing can take place.

For the purpose of narrowing this zone of false operation to a minimum, electrical connections 42 and 43 are provided for deriving a voltage from the primary winding of the transformer 22 of the fine control system and supplying it to the primary winding 31a of the transformer of the coarse control system. The voltages of the transformers 22 and 31 are 180° out of phase with each other within a zone 5° on either side of the 180° error point as defined by the vertical lines 44 and 45. The connections 42 and 43 are so made that the voltage derived from the transformer 22 combines with the voltage of transformer 31 in an additive sense within the zone 42, 43. In other words, the phase of the voltage derived from the transformer 22 is reversed.

The effective value of the secondary voltage of the transformer 31, which is proportional to the sum or resultant of the voltage of the primary winding plus the voltage derived from the transformer 22 is represented by the sinusoidal shaped curve 46.

In operation, the value of the resultant voltage is greater than the critical value represented by horizontal lines 38 and 39 at which control is transferred between the fine and coarse control systems at the boundaries of stable equilibrium defined by the vertical lines 40 and 41. Consequently, the coarse control system does not lose control to the fine control system at these boundaries but retains control until a further increase in the error decreases the resultant voltage to the critical or transfer value which is indicated by the intersections of the curve 46 with the horizontal lines 38 and 39. Thus, the vertical lines 47 and 48 through these intersections define the zone on either side of the 180° error point within which operation of the driving motor 12 is under the control of the fine control system.

If power is restored to the system at any time at which the error is outside the zone defined by vertical lines 47 and 48, the coarse control system will have control of the operation of the follow-up motor and will cause it to drive the driven object to the position of zero error or correspondence with the pilot device.

However, if power is restored to the system at a time when the error is within the zone defined by vertical lines 47 and 48, the fine control system has control and since the secondary voltage of the transformer 22 of the fine control system is 180° out of phase with the secondary coarse voltage of the coarse control system, the motor 12 is energized to drive the driven object in the reverse direction toward the 180° error position.

Thus, the zone within which the system can be synchronized at 180° error is narrowed from the region between the vertical lines 40 and 41 to the region between the vertical lines 47 and 48. The value of the voltage derived from the transformer 22 can be chosen so that this zone is narrowed to 1° on either side of the 180° error point. This narrowing of the zone correspondingly narrows the probability of synchronization at 180° error.

No unwanted undesirable effects are introduced in the operation of the system at, or in the vicinity of, zero error. The only effect of the derived voltage at or near zero error is to reduce the secondary voltage of the transformer 31 of the low speed system and thus to widen the zone within which the fine control system has control of the operation of the driving motor 12. However, since the secondary voltages of the transformers of both the fine and coarse control systems are in phase in the vicinity of zero error, the widening of the zone in which the fine control system has control has no undesirable effect on the system.

Although in accordance with the provisions of the patent statutes this invention has been described as embodied in concrete form and the principle thereof has been explained together with the best mode in which it is now contemplated applying that principle, it will be understood that the apparatus shown and described is merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. A follow-up control system comprising in combination, a pilot device, a driven object, driving means for said object, coarse and fine controlling means responsive to positional disagreement of said pilot device and driven object for producing control voltages for controlling said driving means to drive said object toward a position of correspondence with said pilot device, means for selectively transferring control of said driving means between said fine and coarse controlling means in response to the magnitude of said positional disagreement, and electrical connections for adding to the control voltage produced by said coarse controlling means a voltage derived from the control voltage produced by said fine controlling means.

2. A follow-up control system comprising in combination, a pilot device, a driven object, driving means for said object, amplifier means for controlling the energization of said driving means, coarse and fine controlling means responsive to positional disagreement of said pilot device and driven object for producing alternating control voltages, means responsive to the magnitude of said positional disagreement for rendering said amplifier responsive selectively to said voltages to cause said driving means to drive said object toward correspondence with said pilot device, a first control transformer between said coarse controlling means and said amplifier, a second control transformer between said fine controlling means and said amplifier and electrical connections for adding to said first transformer a voltage derived from said second transformer when said pilot device and driven object are within a predetermined zone of maximum positional disagreement.

3. A follow-up control system comprising in combination, a pilot device, a driven object, driving means for said object, an electric valve amplifier having an input circuit and an output circuit controlled by said input circuit and connected to control the energization of said driving means, coarse and fine controlling means responsive to positional disagreement of said pilot device and driven object for supplying alternating control voltages to said input circuit, means responsive to the magnitude of the control voltage produced by said coarse control means for rendering said amplifier selectively responsive to said control voltages, a first transformer connected between said coarse controlling means and said amplifier, a second transformer between said fine controlling means and said amplifier and electrical connections between the primary windings of said transformers for supplying to the primary winding of said first transformer a voltage derived from the voltage of the primary winding of said second transformer.

BENJAMIN J. FISHER, Jr.